(12) United States Patent
Lee et al.

(10) Patent No.: US 10,409,064 B2
(45) Date of Patent: Sep. 10, 2019

(54) SEE-THROUGH TYPE DISPLAY APPARATUS

(71) Applicant: SAMSUNG ELECTRONICS CO., LTD., Suwon-si (KR)

(72) Inventors: Hongseok Lee, Seoul (KR); Geeyoung Sung, Daegu (KR); Yuntae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 15/355,827

(22) Filed: Nov. 18, 2016

(65) Prior Publication Data
US 2017/0269366 A1 Sep. 21, 2017

(30) Foreign Application Priority Data

Mar. 16, 2016 (KR) .......... 10-2016-0031461

(51) Int. Cl.
*G02B 27/01* (2006.01)
*G02B 27/28* (2006.01)
(Continued)

(52) U.S. Cl.
CPC ....... *G02B 27/0172* (2013.01); *G02B 27/283* (2013.01); *G02B 3/10* (2013.01);
(Continued)

(58) Field of Classification Search
CPC ........ G02B 27/0172; G02B 2027/0178; G02B 2027/0127; G02B 2027/0132;
(Continued)

(56) References Cited

U.S. PATENT DOCUMENTS 5,073,021 A    12/1991 Marron
5,808,800 A *   9/1998 Handschy .......... G02B 27/1033
                                              349/11
(Continued)

FOREIGN PATENT DOCUMENTS

CA    2817226 A1    6/2012
CN    102540466 A   7/2012
(Continued)

OTHER PUBLICATIONS

Examiner provided machine translation of Akira et al., JP H0743633 A (Year: 1995).*

(Continued)

*Primary Examiner* — William R Alexander
*Assistant Examiner* — Balram T Parbadia
(74) *Attorney, Agent, or Firm* — Sughrue Mion, PLLC

(57) ABSTRACT

See-through type display apparatuses and electronic apparatuses including the same are disclosed. A see-through type display apparatus may include a multipath optical member that transfers a plurality of images along a plurality of paths to an ocular organ of a user, and an anisotropic optical member that is arranged between the multipath optical member and the ocular organ of the user. The anisotropic optical member may exhibit characteristics which vary based on a polarization direction of incident light. For example, the anisotropic optical member may function as a lens with respect to light that propagates along a first path and function in a different manner than the lens with respect to light that propagates along a second path. The anisotropic optical member may function as a flat plate with respect to the light that propagates along the second path.

24 Claims, 28 Drawing Sheets

(51) Int. Cl.
*G02B 3/10* (2006.01)
*G02B 27/14* (2006.01)
*G02C 7/06* (2006.01)

(52) U.S. Cl.
CPC .......... *G02B 27/017* (2013.01); *G02B 27/144* (2013.01); *G02B 2027/0123* (2013.01); *G02B 2027/0178* (2013.01); *G02C 7/06* (2013.01)

(58) Field of Classification Search
CPC ...... G02B 27/017; G02B 5/30; G02B 23/125; G02B 27/01; G02B 27/0101; G02B 27/283; G06T 19/006
See application file for complete search history.

(56) References Cited

U.S. PATENT DOCUMENTS

| | | | |
|---|---|---|---|
| 6,023,253 A * | 2/2000 | Taniguchi | G02B 27/0172 345/7 |
| 6,816,314 B2 | 11/2004 | Shimizu et al. | |
| 6,864,861 B2 * | 3/2005 | Schehrer | G02B 27/0172 345/7 |
| 7,639,208 B1 * | 12/2009 | Ha | G02B 27/0172 345/204 |
| 8,988,463 B2 | 3/2015 | Perez et al. | |
| 9,507,150 B1 * | 11/2016 | Stratton | G02B 27/0101 |
| 10,096,735 B2 | 10/2018 | Heo et al. | |
| 2002/0003508 A1 * | 1/2002 | Schehrer | G02B 27/017 345/7 |
| 2003/0067566 A1 * | 4/2003 | Wang | G02F 1/141 349/75 |
| 2004/0240777 A1 * | 12/2004 | Woodgate | G02B 27/2214 385/16 |
| 2009/0166511 A1 * | 7/2009 | Kwon | G01J 1/02 250/206 |
| 2012/0229367 A1 | 9/2012 | Magyari | |
| 2012/0249899 A1 | 10/2012 | Berthelot et al. | |
| 2014/0177063 A1 * | 6/2014 | Wang | G02B 5/30 359/630 |
| 2015/0124227 A1 * | 5/2015 | Kobayashi | G03B 21/2033 353/38 |
| 2017/0115484 A1 * | 4/2017 | Yokoyama | B60K 35/00 |
| 2017/0123204 A1 | 5/2017 | Sung et al. | |

FOREIGN PATENT DOCUMENTS

| | | |
|---|---|---|
| CN | 102540466 B | 7/2014 |
| CN | 106842568 A | 6/2017 |
| EP | 1808722 A2 | 7/2007 |
| EP | 2649485 | 6/2012 |
| EP | 3163379 A1 | 5/2017 |
| JP | 7-43633 A | 2/1995 |
| JP | 2002-90687 A | 3/2002 |
| JP | 2012-159681 A | 8/2012 |
| KR | 10-1999-0048194 A | 7/1999 |
| KR | 10-2017-0046386 A | 5/2017 |
| WO | 2012/078410 A1 | 6/2012 |
| WO | 2014074858 A1 | 5/2014 |

OTHER PUBLICATIONS

Communication dated Jun. 21, 2017, from the European Patent Office in counterpart European Application No. 16198436.4.
Ki-Beom Son et al., "Polarization-Dependent Microlens Array Using Reactive Mesogen Aligned by Top-Down Nanogrooves for Switchable Three-Dimensional Applications", Journal of the Optical Society of Korea, vol. 19, No. 3, Jun. 2015, pp. 265-271. DOI: http://dx.doi.org/10.3807/JOSK.2015.19.3.265.
Communication dated Aug. 16, 2018 issued by the European Patent Office in European Counterpart Application No. 16 198 436.4.
Toralf Scharf, "Refractive Birefringent Optics", Polarized Light in Liquid Crystals and Polymers, Apr. 10, 2006, pp. 258-301.
Herbert Gross, "Advanced Lens Design—Lecture 2: Optimization I", Oct. 22, 2013 (2 pages total).

* cited by examiner

SEE-THROUGH TYPE DISPLAY APPARATUS

CROSS-REFERENCE TO RELATED APPLICATION

This application claims priority from Korean Patent Application No. 10-2016-0031461, filed on Mar. 16, 2016 in the Korean Intellectual Property Office, the disclosure of which is incorporated herein by reference in its entirety.

BACKGROUND

1. Field

Exemplary embodiments relate to a display apparatus, and more particularly, to a see-through type display apparatus.

2. Description of the Related Art

Recently, as electronic apparatuses and display apparatuses capable of implementing virtual reality (VR) have been developed, interest in such apparatuses has increased. As a next step of VR, technologies or methods to implement augmented reality (AR) and mixed reality (MR) have been researched.

Unlike VR that is completely based on a virtual world, AR is a display technology that shows the real world and overlapped (combined) with virtual objects or information thereon, thereby further increasing the effect of reality. While VR is generally limited to fields such as games or virtual experience, AR is advantageous in that it may be applied to various reality environments. In particular, AR attracts attention as next-generation display technology suitable for a ubiquitous environment or an internet of things (IoT) environment. AR may be an example of MR in that it shows a mixture of the real world and additional information (virtual world).

SUMMARY

Provided are see-through type display apparatuses which may be applied to implementations of augmented reality (AR) or mixed reality (MR).

Provided are see-through type display apparatuses having superior performance.

Provided are see-through type display apparatuses which are advantageous in securing a wide angle of view.

Provided are see-through type display apparatuses which have a relatively simple structure, in which main elements are operable in a passive method.

Provided are electronic apparatuses that include the see-through type display apparatuses.

Additional aspects will be set forth in part in the description which follows and, in part, will be apparent from the description, or may be learned by practice of the presented exemplary embodiments.

According to an aspect of an exemplary embodiment, a see-through type display apparatus includes a multipath optical member configured to transfer a first image by using light that propagates along a first path and to transfer a second image by using light that propagates along a second path to an ocular organ of a user, and an anisotropic optical member that is arranged between the multipath optical member and the ocular organ of the user and that includes at least one characteristic that varies based on a polarization direction of incident light, in which the anisotropic optical member is configured to function as a lens with respect to the light that propagates along the first path and to function in a different manner than the lens with respect to the light that propagates along the second path.

The anisotropic optical member may function as a flat plate with respect to the light that propagates along the second path.

The light that propagates along the first path may be polarized in a first direction and incident on the anisotropic optical member, and the light that propagates along the second path may be polarized in a second direction that is orthogonal to the first direction and incident on the anisotropic optical member.

The multipath optical member may include a beam splitter or a transflective film. A first polarizer for the light that propagates along the first path may be provided at a side of a first incident surface of the multipath optical member. A second polarizer for the light that propagates along the second path may be provided at a side of a second incident surface of the multipath optical member. The light along the first path may be polarized by the first polarizer in the first direction, and the light along the second path may be polarized by the second polarizer in the second direction orthogonal to the first direction.

The multipath optical member may include a polarization beam splitter (PBS).

When the multipath optical member includes a polarization beam splitter (PBS), the see-through type display apparatus may further include at least one of a first polarizer for the light that propagates along the first path provided at a side of a first incident surface of the multipath optical member and a second polarizer for the light that propagates along the second path provided at a side of a second incident surface of the multipath optical member.

The first image may be an image formed and provided by the see-through type display apparatus, and the second image may be an outside image that the user faces through the see-through type display apparatus.

The see-through type display apparatus may further include a spatial light modulator for embodying the first image.

The see-through type display apparatus may further include at least one lens in front of or at the rear of the spatial light modulator.

The anisotropic optical member may include an internal element having a lens shape and an external element surrounding the internal element. One of the internal element and the external element may have anisotropic characteristics according to a polarization direction.

The internal element may include at least one of a liquid crystal, an anisotropic polymer, and an anisotropic crystal. The external element may include an isotropic polymer.

The internal element may include an isotropic crystal or an isotropic polymer, and the external element may include an anisotropic polymer.

The internal element may be of a convex lens type or a concave lens type.

The anisotropic optical member may include the internal element in plural.

The anisotropic optical member may include at least one of a bulk lens, a Fresnel lens, a thin lens, and a metasurface lens.

The see-through type display apparatus may have an angle of view greater than or equal to about 40°. The see-through type display apparatus may have an angle of view greater than or equal to about 60° or an angle of view greater than or equal to about 90°.

The see-through type display apparatus may be configured to implement augmented reality (AR) or mixed reality (MR).

At least part of the see-through type display apparatus may constitute a wearable device.

The see-through type display apparatus may be a head mounted display (HMD).

The see-through type display apparatus may be a glasses-type display or a goggle-type display.

According to an aspect of another exemplary embodiment, a see-through type display apparatus includes a transflective member which includes light transmissive and light reflective characteristics and which is configured to transfer an outside image by using transmitted light and to transfer a separate image by using reflected light to an ocular organ of a user, and an anisotropic lens structure arranged between the transflective member and the ocular organ of the user, in which the anisotropic lens structure is configured to function as a lens with respect to the reflected light and as a flat plate with respect to the transmitted light.

The transflective member may include a beam splitter or a transflective film. A first polarizer may be provided at a side of a first incident surface of the transflective member. A second polarizer may be provided at a side of a second incident surface of the transflective member. Light polarized by the first polarizer in a first direction may be reflected by the transflective member and light polarized by the second polarizer in a second direction orthogonal to the first direction may propagate through the transflective member.

The transflective member may include a polarization beam splitter (PBS).

The see-through type display apparatus may have an angle of view greater than or equal to about 40°. The see-through type display apparatus may have an angle of view greater than or equal to about 60° or an angle of view greater than or equal to about 90°.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
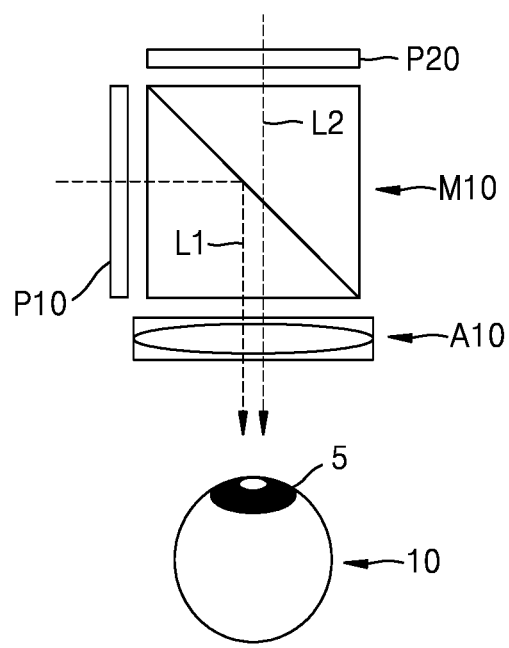
FIG. 1 schematically illustrates a see-through type display apparatus according to an exemplary embodiment.

Various exemplary embodiments will now be described more fully with reference to the accompanying drawings in which exemplary embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, see-through type display apparatuses according to exemplary embodiments, and electronics apparatuses including the see-through type display apparatuses, are described in detail with reference to the accompanying drawings. In the drawings, widths and thicknesses of layers or regions may be exaggerated to a degree for clarity of the specification and for convenience of description. Throughout the detailed description section of the present specification, like reference numerals denote like constituent elements.

FIG. 1 schematically illustrates a see-through type display apparatus according to an exemplary embodiment.

Referring to FIG. 1, the see-through type display apparatus according to the present exemplary embodiment may include a multipath optical member M10. The multipath optical member M10 may transfer a plurality of images according to a plurality of paths to an ocular organ 10 of a user, that is, an eye having a pupil 5. The multipath optical member M10 may transfer a plurality of images according to a plurality of paths to the pupil 5 of a user. For example, the multipath optical member M10 may transfer/guide a first image by light L1 that propagates along a first path and a second image by light L2 that propagates along a second path toward the ocular organ 10. While the light L1 that propagates along the first path may be light reflected from the multipath optical member M10, the light L2 that propagates along the second path may be light transmitted through the multipath optical member M10. Accordingly, the multipath optical member M10 may be a transflective member having both light transmission and light reflection characteristics. In a detailed example, the multipath optical member M10 may include a beam splitter BS or a transflective film. Although FIG. 1 illustrates a case in which the multipath optical member M10 is a beam splitter, such a structure may be changed in various ways.

The see-through type display apparatus of the present exemplary embodiment may include an anisotropic optical member A10 that is arranged between the multipath optical member M10 and the ocular organ 10 of the user. The anisotropic optical member A10 may exhibit different characteristics that vary according to a polarization direction of light incident thereon (incident light). In this regard, the anisotropic optical member A10 may function as a lens with respect to the light L1 that propagates along the first path and as one different from the lens with respect to the light L2 that propagates along the second path. The anisotropic optical member A10 may function as a flat plate (transparent medium) with respect to the light L2 that propagates along the second path. The flat plate is a concept contrary to a lens and may be a light-transmissive plate that does not substantially converge or diverge the incident light. In the exemplary embodiment, the light L1 that propagates along the first path and the light L2 that propagates along the second path may have polarization directions that are different from each other.

The light L1 that propagates along the first path and the light L2 that propagates along the second path may have different polarization directions in various methods. For example, as in the present exemplary embodiment, a first polarizer P10 and a second polarizer P20 may be used. The first polarizer P10 for the light L1 that propagates along the first path may be provided at a side of a first incident surface of the multipath optical member M10, whereas the second polarizer P20 for the light L2 that propagates along the second path may be provided at a side of a second incident surface of the multipath optical member M10. The light L1 that propagates along the first path may be polarized by the first polarizer P10 in a first direction, whereas the light L2 that propagates along the second path may be polarized by the second polarizer P20 in a second direction that is different from the first direction. The second direction may be orthogonal to the first direction. As such, as described above, the anisotropic optical member A10 may exhibit different characteristics with respect to the lights L1 and L2 having different polarization directions.

The first image transferred by the light L1 that propagates along the first path may be an image formed and provided by the see-through type display apparatus. The first image may include virtual reality and/or virtual information, as a "display image". The second image transferred by the light L2 that propagates along the second path may be an outside image that the user faces through see-through type display apparatus. The second image may include a foreground image that the user faces, and a certain background subject. The second image may be an image of the real world. Accordingly, the see-through type display apparatus according to the present exemplary embodiment may be applied to the implementation of augmented reality (AR) or mixed reality (MR).

In the following description, how the anisotropic optical member A10 functions differently with respect to the light L1 that propagates along the first path and the light L2 that propagates along the second path is described in detail with reference to FIGS. 2A and 2B.

Figure 2A:
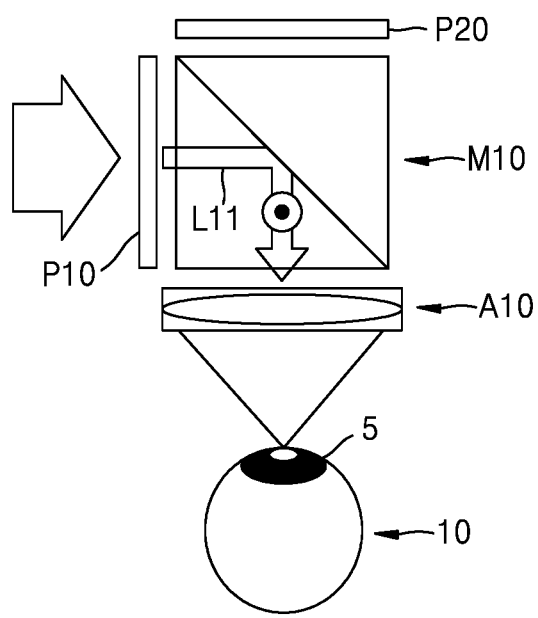
FIGS. 2A and 2B are drawings for explaining the principle and function of the see-through type display apparatus of FIG. 1.

As illustrated in FIG. 2A, light L11 of the first path may be polarized by the first polarizer P10 in a first direction, for example, a direction perpendicular to a surface of the drawing sheet, and be incident on the anisotropic optical member A10. The anisotropic optical member A10 may functions as a lens with respect to light L11 of the first path. The ocular organ 10 may see the display image by the light L11 of the first path through the anisotropic optical member A10 functioning as a lens. Since the anisotropic optical member A10 as a lens is arranged close to the ocular organ 10, a focal length f of the lens compared to a diameter D of the lens may be relatively short. As a result, a wide angle of view or a wide field of view may be easily secured.

Figure 2B:
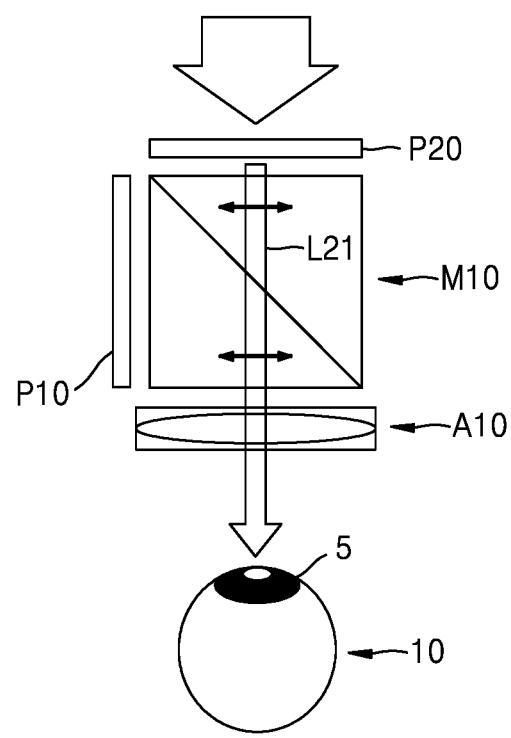

As illustrated in FIG. 2B, when the second image by the light L21 that propagates along the second path is to be seen, the anisotropic optical member A10 may function as a "flat plate," not a "lens". In other words, the light L21 that propagates along the second path may be incident on the anisotropic optical member A10 by being polarized by the second polarizer P20 in the second direction, for example, a direction orthogonal to the first direction. As the anisotropic optical member A10 function as a "flat plate" with respect to the light L21 that propagates along the second path, a problem of distorting the second image may not be generated. Accordingly, the user may see the second image without distortion.

When the first image is a virtual display image and the second image is an image (outside image) of the real world, the anisotropic optical member A10 may function as a lens with respect to the display image, thereby increasing a viewing angle, whereas the anisotropic optical member A10 may function as a flat plate with respect to the outside image, thereby preventing the image distortion problem. These effects may be simultaneously obtained due to the anisotropic characteristics of the anisotropic optical member A10.

For a general see-through type display apparatus, in order to see the outside image in a see-through manner without distortion, no lens should be disposed in front of a user's eye. In other words, a lens that distorts the outside image should not be between the user's eye and the outside foreground. Accordingly, a lens to see a virtual display image needs to be arranged so as to avoid an area between the user's eye and the outside foreground (avoidance arrangement). In this case, however, since an optical path between the user's eye and the lens becomes relatively long, a problem of decreased viewing angle may arise. For example, when the lens is arranged in a conventional manner, the angle of view may be about 20°, which is quite narrow.

However, according to the present exemplary embodiment, as the anisotropic optical member A10 is arranged between the ocular organ 10 and the multipath optical member M10, the anisotropic optical member A10 may function as a lens with respect to the display image and as a flat plate with respect to the outside image. Accordingly, as the optical path between the ocular organ 10 and the anisotropic optical member A10 is shortened, a wide angle of view of the display image may be easily secured. In addition, the outside image may be seen without distortion as the anisotropic optical member A10 functions as a flat plate. The see-through type display apparatus may have an angle of view greater than or equal to about 40° or greater than or equal to about 60°. The angle of view may be greater than or equal to about 90°.

Although in FIG. 1 the polarization directions of the lights L1 and L2 of the first and second paths are controlled to be different from each other by using the first and second polarizers P10 and P20, the polarization directions of the lights L1 and L2 may be controlled to be different from each other by using another method instead of using the first and second polarizers P10 and P20. For example, the functions of the first and second polarizers P10 and P20 may be incorporated in the multipath optical member M10. In detail, when a polarization beam splitter (PBS) is used as the multipath optical member M10, the first and second polarizers P10 and P20 may be eliminated, and FIGS. 3A and 3B illustrate an example thereof.

Figure 3A:
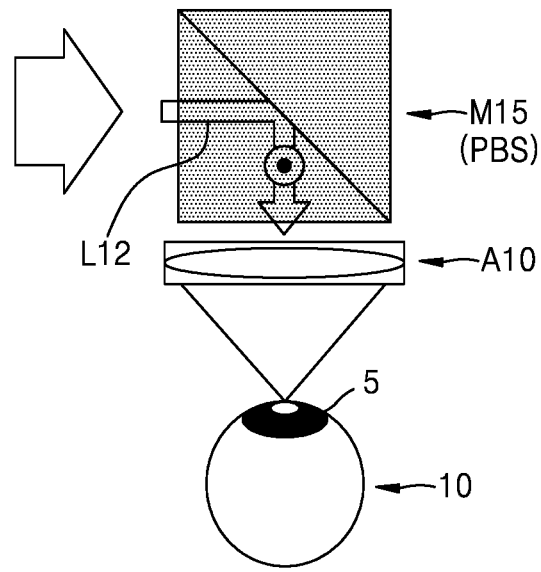
FIGS. 3A and 3B illustrate a see-through type display apparatus according to another exemplary embodiment.
Figure 3B:
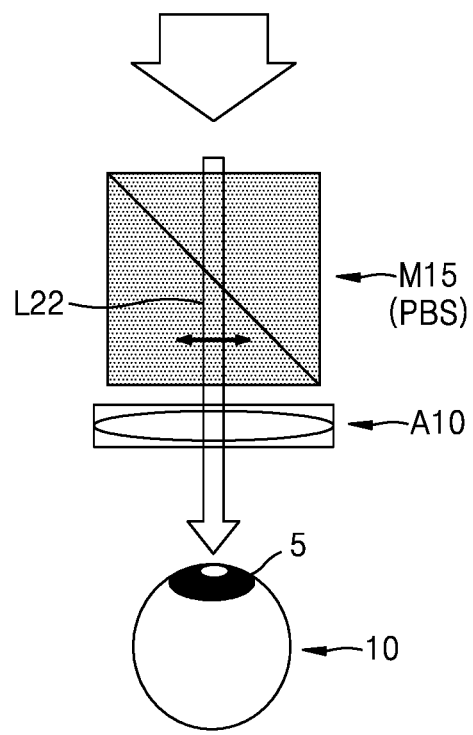

Referring to FIGS. 3A and 3B, a polarization beam splitter (PBS) may be used as a multipath optical member M15. The polarization beam splitter (PBS) may reflect light having a first polarization direction and transmit light having a second polarization direction. Accordingly, when the polarization beam splitter (PBS) is in use, the functions described with reference to FIGS. 2A and 2B may be performed without a separate polarizer. FIG. 3A and FIG. 3B may functionally correspond to FIG. 2A and FIG. 2B, respectively.

In FIG. 3A, light L12 that propagates along a first path may be reflected by the multipath optical member M15 and be incident on the anisotropic optical member A10. Also, the light L12 that propagates along the first path may be polarized by the multipath optical member M15 in a first direction. In FIG. 3B, light L22 that propagates along a second path may transmit through the multipath optical member M15 and be incident on the anisotropic optical member A10. Also, the light L22 that propagates along the second path may be polarized by the multipath optical member M15 in a second direction. The second direction may be orthogonal to the first direction.

When a separate polarizer is not used as in FIGS. 3A and 3B, the structure of the see-through type display apparatus may be simplified. However, if necessary, at least one of the first and second polarizers P10 and P20 of FIG. 1 may be used even in the exemplary embodiment of FIGS. 3A and 3B. When at least one separate polarizer is used in the exemplary embodiment of FIGS. 3A and 3B, the efficiency of polarization and performance of polarization may be improved. For example, an effect of increasing a contrast ratio CR of a display screen may be obtained.

Figure 4:
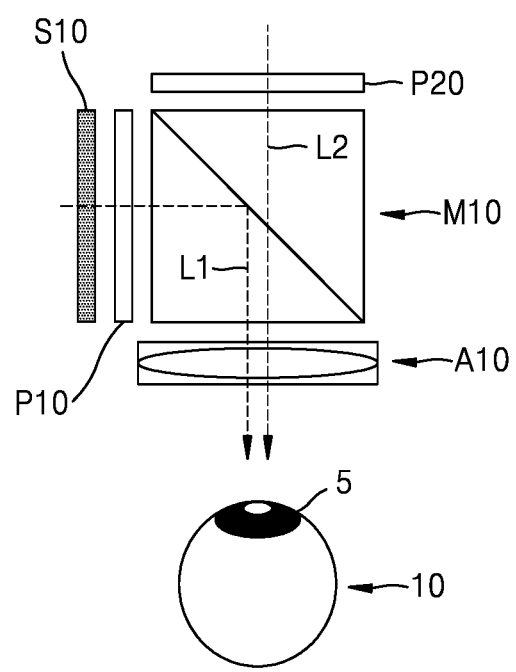
FIG. 4 illustrates a see-through type display apparatus according to another exemplary embodiment.

In the exemplary embodiments of FIGS. 1, 2A, 2B, 3A, and 3B, the first image is transferred to the ocular organ 10 by the lights L1, L11, and L12 that propagate along the first path, in which an "image forming device" for forming the first image may be further provided. In a detailed example, the image forming device may include a spatial light modulator (SLM). FIG. 4 illustrates an example in which a spatial light modulator (SLM) S10 is added to the structure of the see-through type display apparatus of FIG. 1.

Referring to FIG. 4, the spatial light modulator (SLM) S10 may be provided in an area through which the light L1 that propagates along the first path passes. The SLM S10 may be arranged at a position facing the multipath optical member M10 with the first polarizer P10 therebetween. However, the position of the SLM S10 in FIG. 4 is exemplary and may be changed in various ways. The SLM S10 may be an amplitude modulation SLM, a phase modulation SLM, or a complex SLM that modulates both amplitude and phase. Also, the SLM S10 may be a transmissive light modulator, a reflective light modulator, or a transflective light modulator. In a detailed example, the SLM S10 may include a liquid crystal on silicon (LCoS) panel, a liquid crystal display (LCD) panel, or a digital light projection (DLP) panel. The DLP panel may include a digital micromirror device (DMD). FIG. 4 is based on an assumption that the SLM S10 is of a transmissive type. When the SLM S10 is a reflective type or a transflective type, the position of the SLM S10 or a relative arrangement relation of the SLM S10 with respect to other elements may vary. An image embodied by using the SLM S10 may be a two-dimensional (2D) image or a three-dimensional (3D) image. The 3D image may be a holographic image, a stereo image, a light field image, or an integral photography (IP) image.

Figure 5:
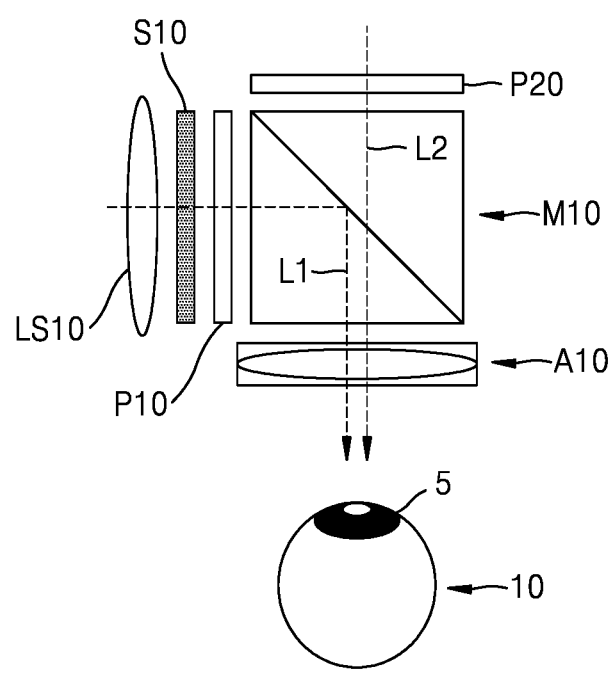
FIG. 5 illustrates a see-through type display apparatus according to another exemplary embodiment.
Figure 6:
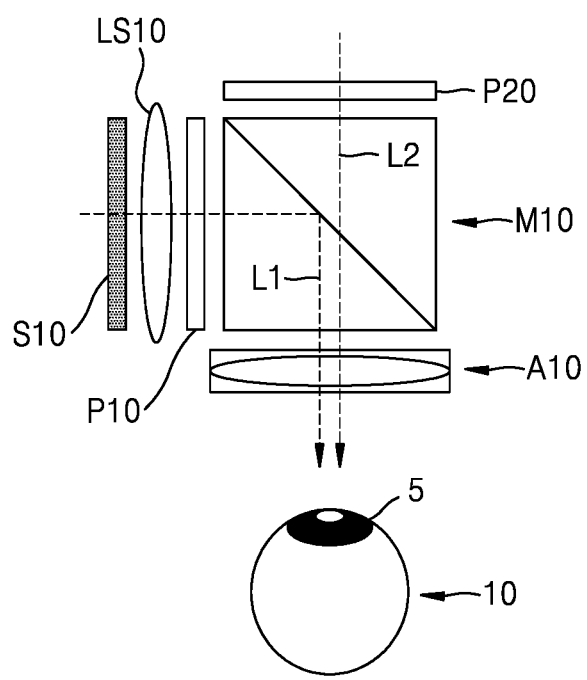
FIG. 6 illustrates a see-through type display apparatus according to another exemplary embodiment.

When the SLM S10 is used as in the exemplary embodiment of FIG. 4, at least one lens that is arranged in front of or at the rear of the SLM S10 may be further used, and FIGS. 5 and 6 illustrate examples thereof.

FIG. 5 illustrates a case in which a lens LS10 is provided in front of the SLM S10, and FIG. 6 illustrates a case in which the lens LS10 is provided at the rear of the SLM S10. Although FIGS. 5 and 6 illustrate that only one lens LS10 is provided at one side of the SLM S10, two or more lenses may be provided and, in some cases, a single lens or a plurality of lenses may be provided at the front or rear side of the SLM S10. Since the anisotropic optical member A10 functions as a lens with respect to the light L1 that propagates along the first path, the lens LS10 described with reference to FIGS. 5 and 6 may be an additional lens or an auxiliary lens. A focal length or a numerical aperture NA of an optical system may be adjusted by using the additional lens LS10. For example, when a refractive power of the anisotropic optical member A10 as a lens is weak, an increase of focal length may be addressed by additionally using the lens LS10. In other words, by additionally using the lens LS10, the anisotropic optical member A10 having a reduced focal length may be used. In this case, a viewing angle may be easily increased. However, the purpose of using the additional lens LS10 is not limited thereto and may be changed in various ways. Also, the shape of the lens LS10 that is additionally used in FIGS. 5 and 6 is merely an example and may be changed in various ways.

Figure 7:
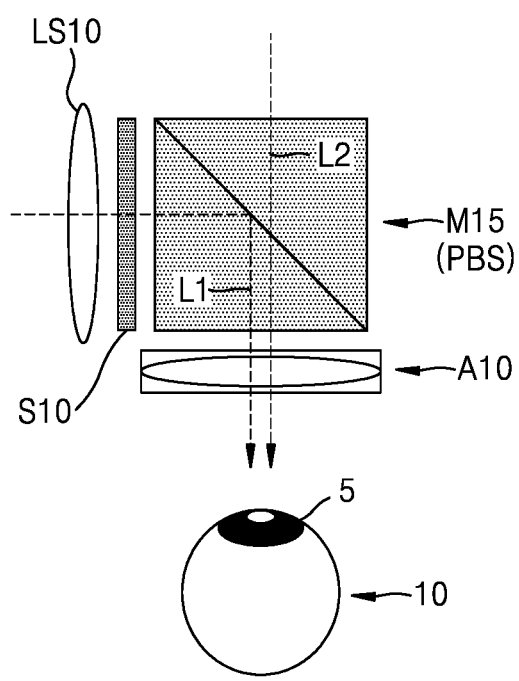
FIG. 7 illustrates a see-through type display apparatus according to another exemplary embodiment.

The SLM S10 and the lens LS10 described with reference to FIG. 4 to FIG. 6 may be applied to the exemplary embodiment described with reference to FIGS. 3A and 3B, and FIG. 7 illustrates an example thereof.

Referring to FIG. 7, a polarization beam splitter (PBS) may be used as the multipath optical member M15. In this state, the SLM S10 and the lens L510 may be provided adjacent to the multipath optical member M15. The functions of the SLM S10 and the lens LS10 may substantially be the same as those described with reference to FIGS. 4, 5, and 6. The positions of the SLM S10 and the lens LS10 may be changed and, in some cases, the lens LS10 may be omitted.

Figure 8:
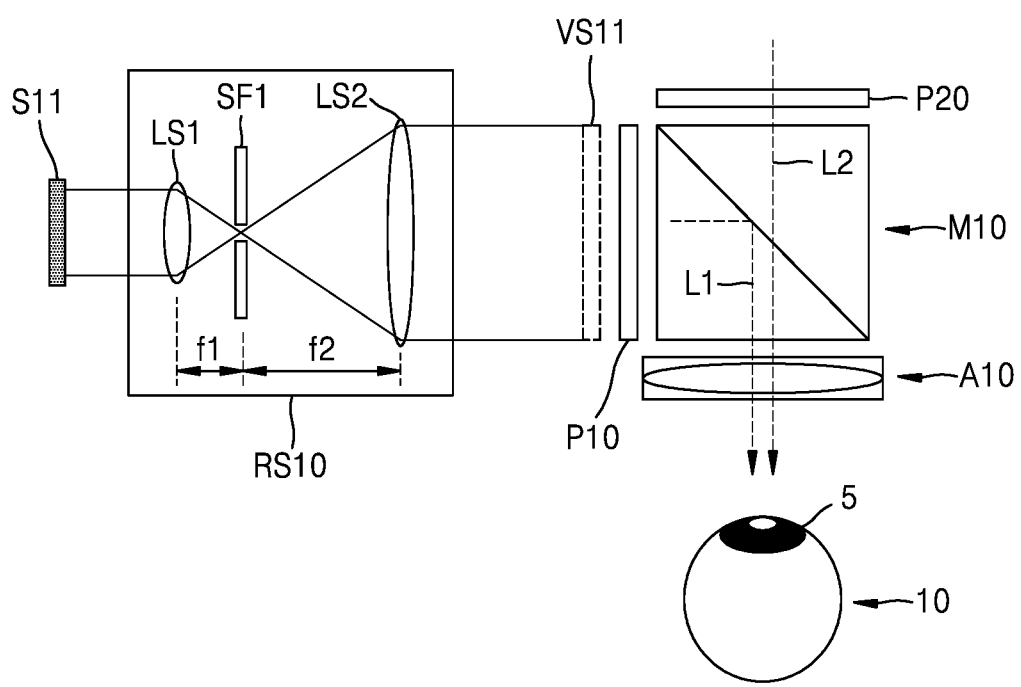
FIG. 8 illustrates a see-through type display apparatus according to another exemplary embodiment.

FIG. 8 illustrates a see-through type display apparatus according to another exemplary embodiment.

Referring to FIG. 8, the see-through type display apparatus of the present exemplary embodiment may be configured to form a "virtual image VS11" of an SLM S11. For example, the virtual image VS11 of the SLM S11 may be formed by using a relay optical system RS10. In the following description, the virtual image VS11 of the SLM S11 is referred to as the virtual SLM VS11. The virtual SLM VS11 may be referred to as an "imaged SLM". The virtual SLM VS11 may be formed in an area adjacent to the multipath optical member M10.

The relay optical system RS10 may include, for example, a first relay lens LS1, a second relay lens LS2, and a spatial filter SF1 between the first and second relay lenses LS1 and LS2. The first relay lens LS1 may have a first focal length f1, and the second relay lens LS2 may have a second focal length f2. The spatial filter SF1 may be located on or around a focal plane of the first and second relay lenses LS1 and LS2. The spatial filter SF1 may have an aperture such as a pinhole and may remove noise from light that passed through the first relay lens LS1.

The first focal length f1 of the first relay lens LS1 and the second focal length f2 of the second relay lens LS2 may be the same as or different from each other. The size of the virtual SLM VS11 may vary according to a relative size, for example a ratio of the first focal length f1 and the second focal length f2. For example, when the second focal length f2 is greater than the first focal length f1, the virtual SLM VS11 may be larger than the real SLM S11. When the first focal length f1 is greater than the second focal length f2, the virtual SLM VS11 may be smaller than the real SLM S11. Accordingly, the size of the virtual SLM VS11 may be controlled to a desired level by adjusting the first and second focal lengths f1 and f2. The user may see a display image obtained through the virtual SLM VS11. However, the above-described structure of the relay optical system RS10 is merely exemplary and may be changed in various ways.

Figure 9:
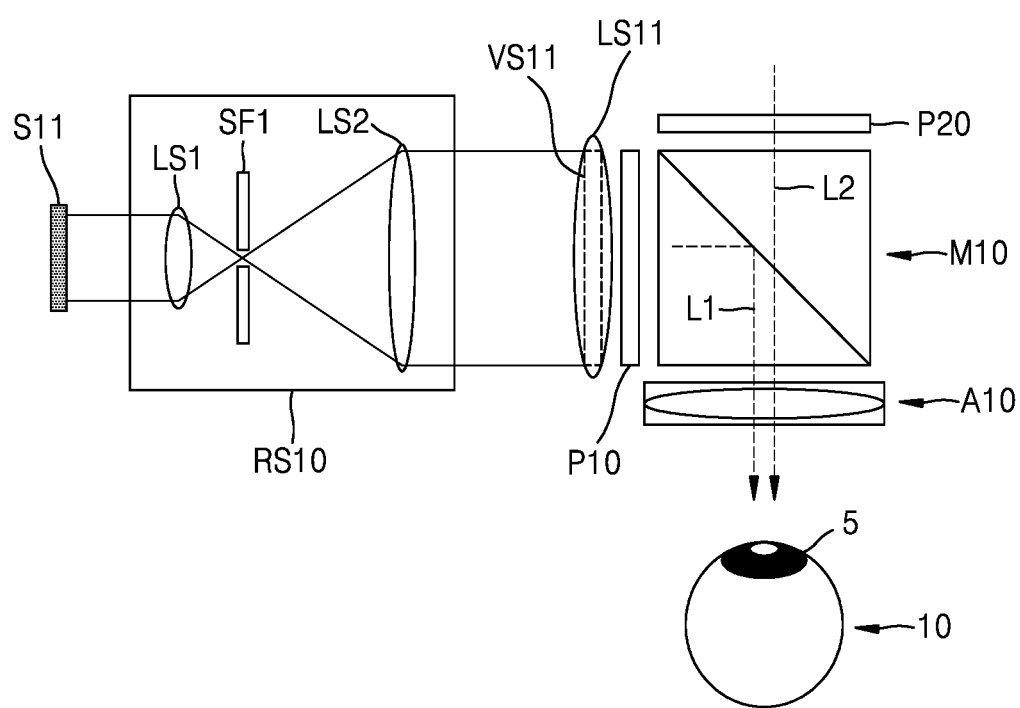
FIG. 9 illustrates a see-through type display apparatus according to another exemplary embodiment.

According to another exemplary embodiment, the structure of FIG. 8 may further include at least one additional lens, and FIG. 9 illustrates an example thereof.

Referring to FIG. 9, a lens LS11 may be further provided between the relay optical system RS10 and the multipath optical member M10. The virtual SLM VS11 may be formed on the lens LS11 or in an area adjacent to the lens LS11. Although FIG. 9 illustrates a case in which the virtual SLM VS11 is formed on the lens LS11, the virtual SLM VS11 may be formed in front of or at the rear of the lens LS11. A focal length or a numerical aperture NA of an optical system may be adjusted by using the additional lens LS11.

Figure 10:
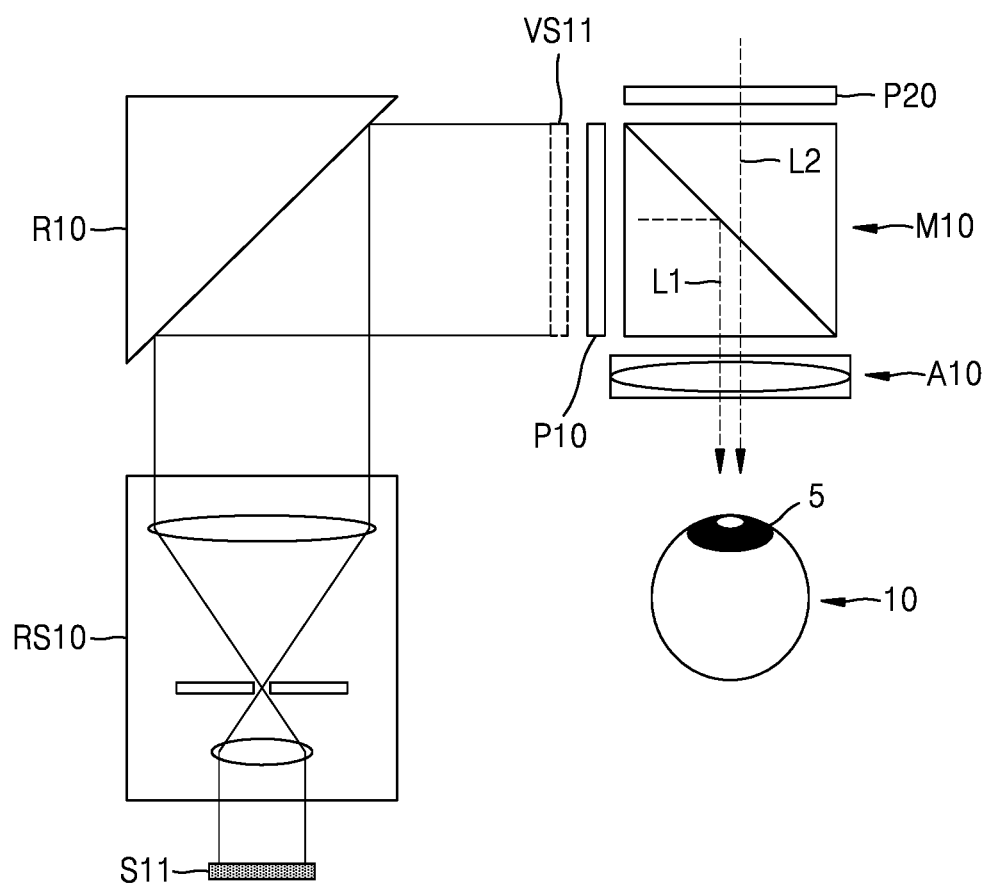
FIG. 10 illustrates a see-through type display apparatus according to another exemplary embodiment.

According to another exemplary embodiment, the relay structure of FIGS. 8 and 9 may be changed in various ways, and FIG. 10 illustrates an example thereof.

Referring to FIG. 10, a path of light output from the relay optical system RS10 may be changed by using a reflection member R10. The virtual SLM VS11 may be formed by light reflected by the reflection member R10. Accordingly, a see-through type display apparatus of the present exemplary embodiment may have a folded structure. The above-described structure of the reflection member R10 is exemplary, and a reflection member having a different structure or a plurality of reflection members may be used.

Although not illustrated in FIGS. 8, 9, and 10, a light source unit that is configured for irradiating light onto the real SLM S11 may be further provided. The light source unit may include, for example, a light source and a collimator lens. Also, although not illustrated, a controller configured for controlling the light source unit and the real SLM S11 may be further provided. Also, when the real SLM S11 of a reflective type is used, the virtual SLM VS11 may be formed by using the light reflected from the real SLM S11.

According to another exemplary embodiment, the virtual SLM VS11 may be formed at the rear of the multipath optical member M10. For example, the virtual SLM VS11 may be formed between the multipath optical member M10 and the anisotropic optical member A10 or around the anisotropic optical member A10, and FIGS. 11 and 12 illustrate examples thereof.

Figure 11:
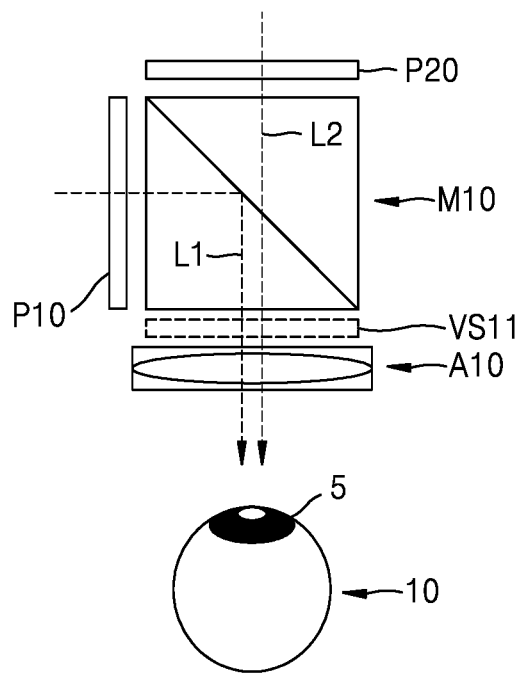
FIG. 11 illustrates a see-through type display apparatus according to another exemplary embodiment.
Figure 12:
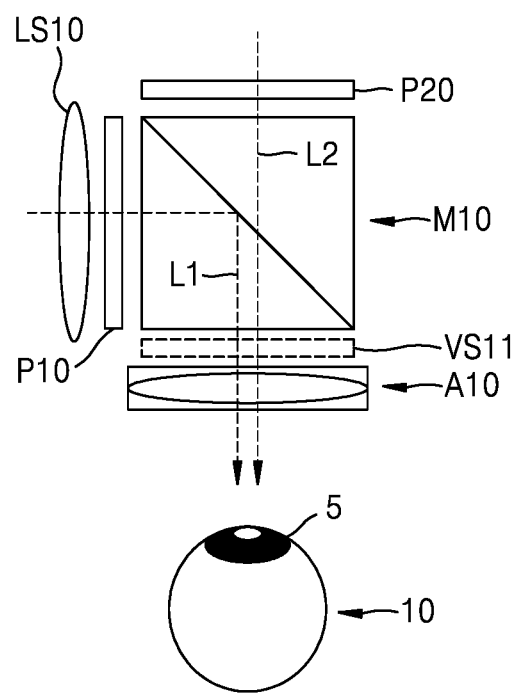
FIG. 12 illustrates a see-through type display apparatus according to another exemplary embodiment.

Referring to FIGS. 11 and 12, in the structure of an optical system similar to that of FIG. 4, the virtual SLM VS11 may be formed at a side of the anisotropic optical member A10. Since the virtual SLM VS11 is not an actual SLM and functions as one that provides a display image to a user, the user may see the outside image without interference.

Figure 13:
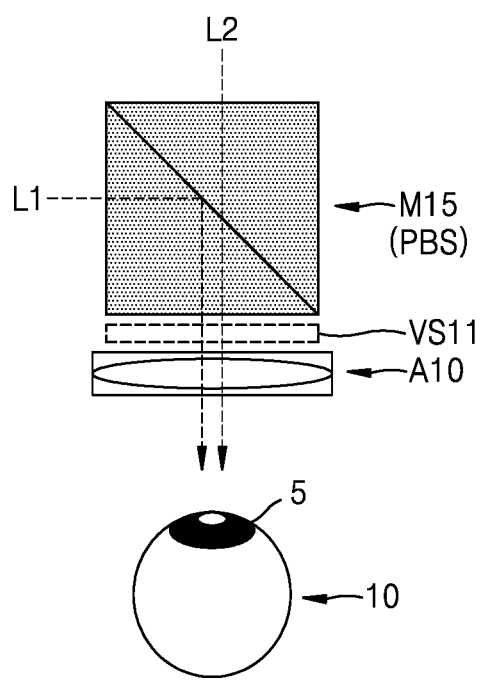
FIG. 13 illustrates a see-through type display apparatus according to another exemplary embodiment.
Figure 14:
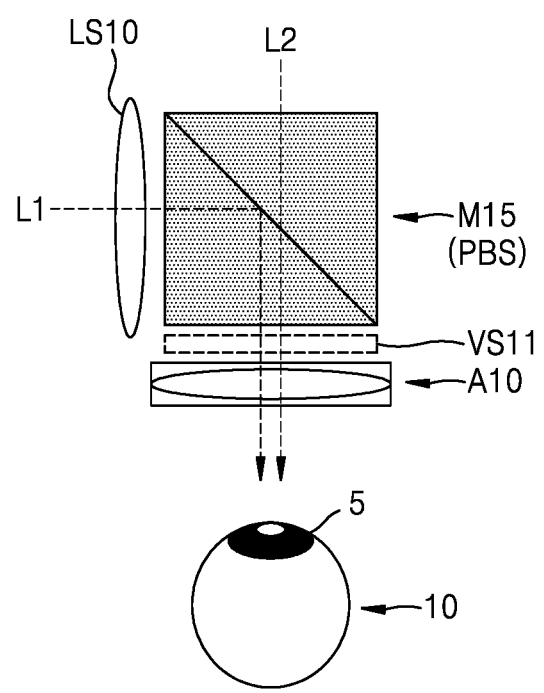
FIG. 14 illustrates a see-through type display apparatus according to another exemplary embodiment.

FIGS. 13 and 14 illustrate a case in which the virtual SLM VS11 of FIGS. 11 and 12 is applied to an optical structure similar to that of FIG. 7, in which a polarization beam splitter (PBS) is employed as the multipath optical member M15.

In the following description, the principle and various structures of the anisotropic optical member A10 are exemplarily described with reference to FIGS. 15, 16, 17, and 18.

Figure 15:
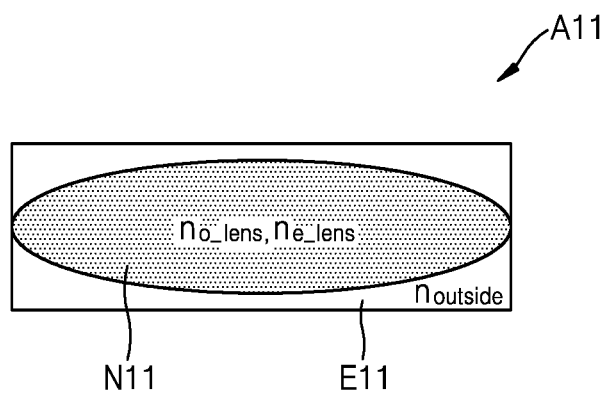
FIGS. 15, 16, 17, and 18 illustrate examples of anisotropic optical members according to exemplary embodiments, which are applicable to a see-through type display apparatus.

FIG. 15 illustrates an example of an anisotropic optical member A11 according to exemplary embodiments, which is applicable to a see-through type display apparatus.

Referring to FIG. 15, the anisotropic optical member A11 may include an internal element N11 having a lens shape and an external element E11 surrounding the internal element N11. One of the internal element N11 and the external element E11 may have anisotropic characteristics according to a polarization direction of incident light. For example, the internal element N11 may have anisotropic characteristics so that a refractive index of the internal element N11 varies according to the polarization direction of incident light. In this state, the external element E11 may have the same characteristics regardless of the polarization direction of incident light. In other words, the external element E11 may have isotropic characteristics.

When the internal element N11 has two refractive indexes $n_{o\_lens}$ and $n_{e\_lens}$ according to the polarization direction of incident light, the refractive index $n_{o\_lens}$ may be a refractive index in an ordinary state, and the refractive index $n_{e\_lens}$ may be a refractive index in an extraordinary state. The external element E11 may have a constant refractive index $n_{outside}$ regardless of the polarization direction of incident light. In this case, the following conditions may be satisfied.

When the anisotropic optical member A11 functions as a lens, $$(n_{o\_lens} \text{ or } n_{e\_lens}) \neq n_{outside}$$

When the anisotropic optical member A11 functions as a flat plate, $$n_{outside} = n_{o\_lens} \neq n_{e\_lens}, \text{ or}$$

$$n_{outside} = n_{e\_lens} \neq n_{o\_lens}$$

When the refractive indexes $n_{o\_lens}$ and $n_{e\_lens}$ of the internal element N11 are different from each other and one of them is the same as the refractive index $n_{outside}$ of the external element E11, the anisotropic optical member A11 functions as a lens or a flat plate according to the polarization direction of incident light. If these conditions are satisfied, any combination of a material of the internal element N11 and a material of the external element E11 may be possible.

Although FIG. 15 illustrates a case in which the internal element N11 has a convex lens shape and anisotropic characteristics, it may have a concave lens shape and no anisotropic characteristics. Instead, the external element E11 may have anisotropic characteristics.

Figure 16:
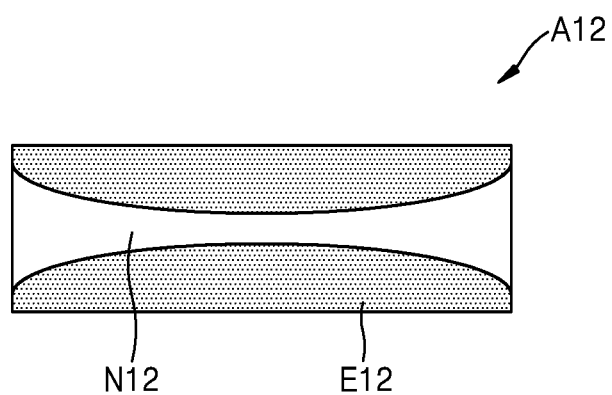

FIG. 16 illustrates a case in which an internal element N12 of an anisotropic optical member A12 has a concave lens shape. Opposite surfaces (i.e., an incident surface and an exit surface) of an external element E12 may be flat surfaces. Even when the internal element N12 structurally has a concave lens shape, the internal element N12 may function as a convex lens according to a relation between a refractive index of the internal element N12 and a refractive index of the external element E12. One of the internal element N12 and the external element E12 may have anisotropic characteristics, whereas the other one may have isotropic characteristics.

In FIGS. 15 and 16, the internal elements N11 and N12 may include at least one of a liquid crystal, an anisotropic polymer, and an anisotropic crystal. In this case, the external elements E11 and E12 may include an isotropic polymer. Alternatively, the internal elements N11 and N12 may include an isotropic crystal or an isotropic polymer, and the external elements E11 and E12 may include an anisotropic polymer. However, other materials that are not presented may be applied to the internal elements N11 and N12 or to the external elements E11 and E12.

Additionally, the liquid crystal may be used in a state in which an orientation direction of the liquid crystal is fixed by a certain method. For example, the orientation direction of liquid crystal may be fixed by using an ultraviolet ray in a state where an electric field is applied, by a distributed illumination method, or by other methods. Also, the orientation direction of liquid crystal may be controlled by an active manner.

Figure 17:
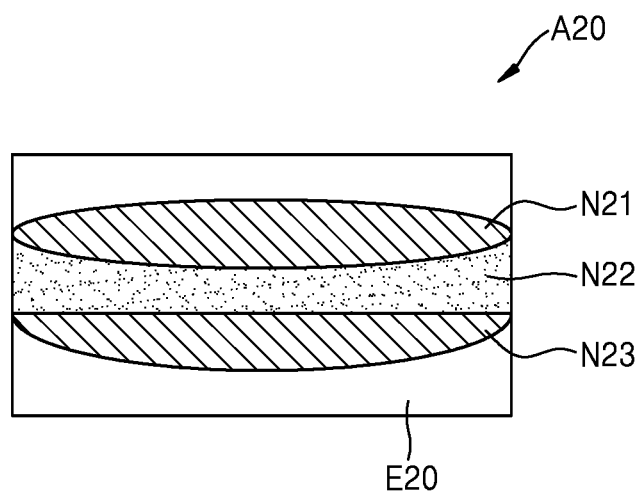
Figure 18:
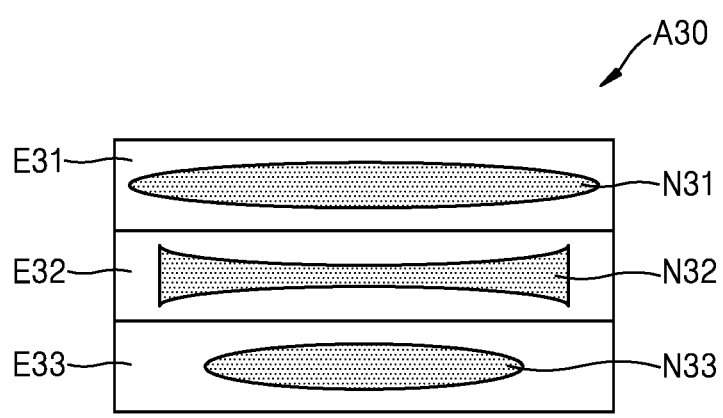

Although FIGS. 15 and 16 illustrate a case of using one internal element N11 or N12, according to another exemplary embodiment, a plurality of internal elements may be used, and FIGS. 17 and 18 illustrate examples thereof.

Referring to FIG. 17, an anisotropic optical member A20 may include a plurality of internal elements N21, N22, and N23, and further includes an external element E20 surrounding the internal elements N21, N22, and N23. The internal elements N21, N22, and N23 may be bonded to one another, forming a single lens shape as a whole. At least two of the internal elements N21, N22, and N23 may have different refractive indexes. Each of the internal elements N21, N22, and N23 may have anisotropic characteristics, and the external element E20 may have isotropic characteristics.

Referring to FIG. 18, an anisotropic optical member A30 may include a plurality of internal elements N31, N32, and N33 spaced apart from one another. A plurality of external elements E31, E32, and E33 that respectively surround the internal elements N31, N32, and N33 may be further provided. The internal elements N31, N32, and N33 may have different characteristics and/or different structures. The refractive indexes of the internal elements N31, N32, and N33 may be different from or the same as one another. The internal elements N31, N32, and N33 may have anisotropic characteristics and the external elements E31, E32, and E33 may have isotropic characteristics, or vice versa. The external elements E31, E32, and E33 may form one body. The shapes and number of the internal elements N21~N23 and N31~N33 illustrated in FIGS. 17 and 18 are merely exemplary and may be changed in various ways.

Although FIGS. 15, 16, 17, and 18 illustrate a case in which a general lens structure is applied to the anisotropic optical members A11, A12, A20, and A30, detailed structures of the anisotropic optical members A11, A12, A20, and A30 may be changed in various ways. For example, the anisotropic optical members A11, A12, A20, and A30 may be modified to include a Fresnel lens structure or a metasurface lens structure. Accordingly, the anisotropic optical members A11, A12, A20, and A30 may include at least one of various structures such as a bulk lens structure, a thin lens structure, a Fresnel lens structure, and a metasurface lens structure. For example, a thickness of the thin lens may be several millimeters or less, and a thickness of the bulk lens may be greater than several millimeters or greater than several tens of millimeters.

Figure 19:
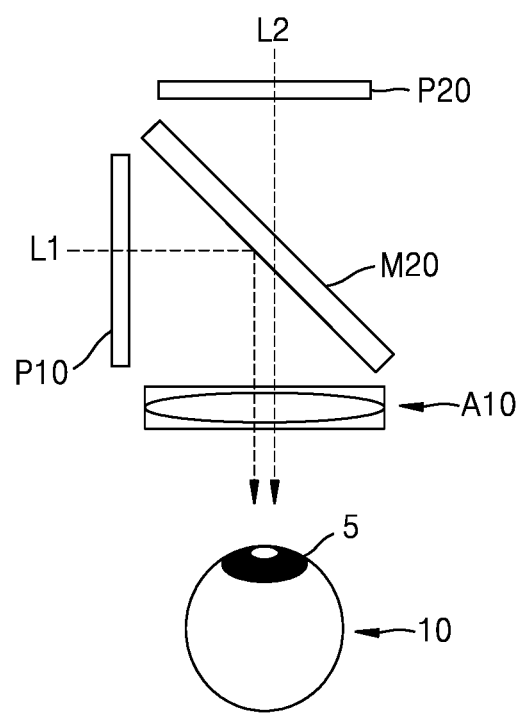
FIG. 19 illustrates a see-through type display apparatus according to another exemplary embodiment.

In the exemplary embodiments of FIGS. 1 to 14, although a beam splitter (BS) or a polarization beam splitter (PBS) are primarily used as the multipath optical members M10 and M15, detailed structures of the multipath optical members M10 and M15 may be changed in various ways. For example, as illustrated in FIG. 19, a multipath optical member M20 in the form of a film or a plate may be employed. The multipath optical member M20 of FIG. 19 has a transflective function and may be formed of glass or plastic. An inclination angle of the multipath optical member M20 is exemplary and may be changed.

In the exemplary embodiments of FIGS. 1 to 14 and FIG. 19, the anisotropic optical member A10 may be a passive element. In other words, even when no external electric signal is applied to the anisotropic optical member A10, the characteristics of the anisotropic optical member A10 may be automatically controlled according to the polarization direction of incident light. Accordingly, there is no need to apply an electric signal to the anisotropic optical member A10, and the position or shape of the anisotropic optical member A10 does not need to be controlled. In this case, a separate driver for the anisotropic optical member A10 need not be installed, and thus, an overall structure and an operation method of a transmissive display apparatus may be simplified. However, the anisotropic optical member A10 is not limited to a passive element and, in some cases, may be an active element.

Although in the above exemplary embodiments the multipath optical member M10, M15, or M20 and the anisotropic optical member A10 are separately provided, in some cases, the characteristics of an anisotropic optical member may be incorporated in a multipath optical member. In other words, a multipath optical member having the characteristics of an anisotropic lens may be employed, and FIG. 20 illustrates an example thereof.

Figure 20:
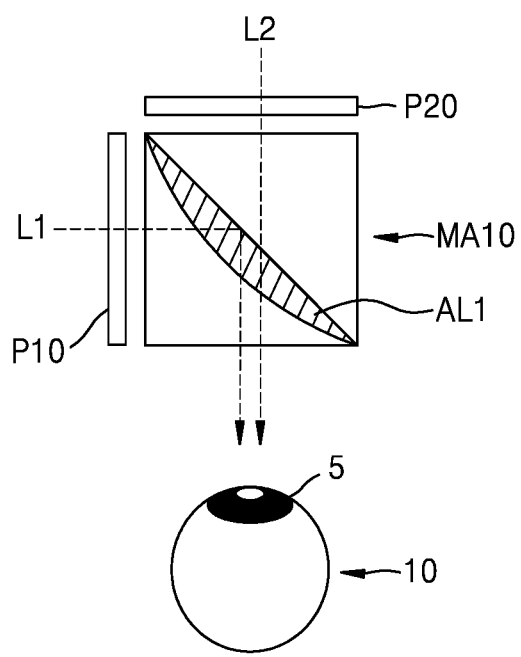
FIG. 20 illustrates a see-through type display apparatus according to another exemplary embodiment.

Referring to FIG. 20, a multipath optical member MA10 may have optical path splitting characteristics and simultaneously the characteristics of an anisotropic lens. For example, as an anisotropic lens portion AL1 is included in an optical element such as a beam splitter BS, the multipath optical member MA10 having anisotropic lens characteristics may be implemented. In this case, a separate anisotropic optical member need not be provided. If the multipath optical member MA10 of FIG. 20 has polarization characteristics, for example the characteristics of a polarization beam splitter (PBS), at least one of the first and second polarizers P10 and P20 need not be provided.

Figure 21:
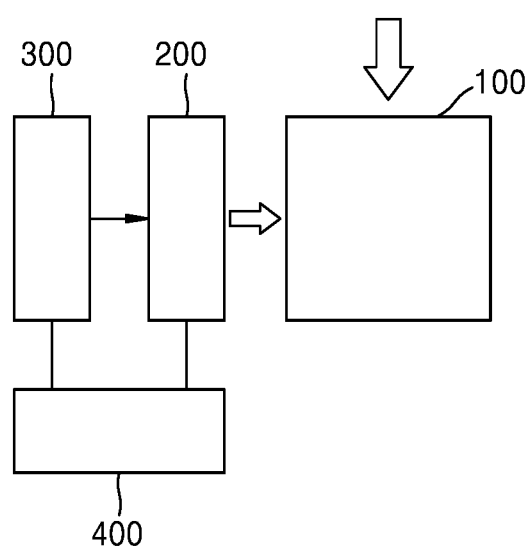
FIG. 21 is a block diagram schematically illustrating an overall structure/system of a see-through type display apparatus, according to an exemplary embodiment.

FIG. 21 is a block diagram schematically illustrating an overall structure/system of a see-through type display apparatus, according to an exemplary embodiment.

Referring to FIG. 21, a see-through type optical system 100 may be provided. An image forming unit 200 that is configured for providing a display image to the see-through type optical system 100 may be provided. A light source unit 300 that is configured for irradiating light to the image forming unit 200 may be provided. Also, a controller 400 that is connected to the light source unit 300 and the image forming unit 200 may be provided.

The see-through type optical system 100 may include the multipath optical member M10, M15 or M20 and the anisotropic optical member A10~A12, A20 or A30, which are described above. Alternatively, the see-through type optical system 100 may include the multipath optical member MA10 of FIG. 20 having anisotropic lens characteristics. The image forming unit 200 may include the above-described SLM S10 or S11, and further include the relay optical system RS10, if necessary. The light source unit 300 may include, for example, a light source and a collimator lens. The controller 400 may control the image forming unit 200 and the light source unit 300 by being connected thereto. Also, the controller 400 may further include a processor, such as, for example, a central processing unit (CPU). Although not illustrated, the see-through type display apparatus of FIG. 21 may further include an input unit and an output unit for a user interface.

Figure 22:
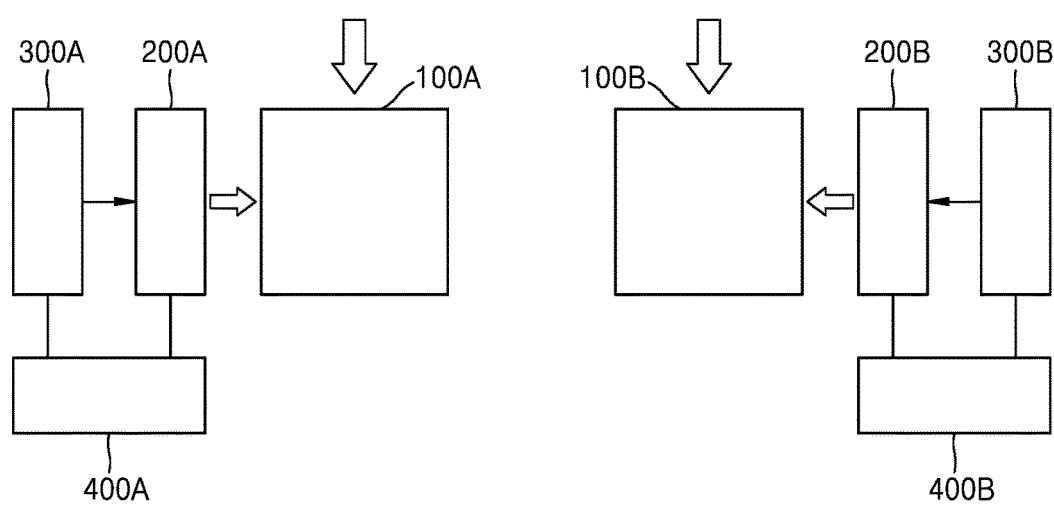
FIG. 22 is a block diagram schematically illustrating an overall structure/system of a see-through type display apparatus, according to another exemplary embodiment.

The structure of FIG. 21 may be provided in one pair that is left and right symmetric (i.e., bilaterally symmetric), and FIG. 22 illustrates an example thereof.

Referring to FIG. 22, a first see-through type optical system 100A, and a first image forming unit 200A, a first light source unit 300A, and a first controller 400A, which correspond to the first see-through type optical system 100A, may be provided. A second see-through type optical system 100B may be provided spaced apart from the first see-through type optical system 100A. A second image forming unit 200B, a second light source unit 300B, and a second controller 400B, which correspond to the second see-through type optical system 100B, may be provided. The first see-through type optical system 100A may be arranged to correspond to the left eye of a user, whereas the second see-through type optical system 100B may be arranged to correspond to the right eye of the user. Accordingly, the structure of FIG. 22 may be applied to a binocular display apparatus.

Figure 23:
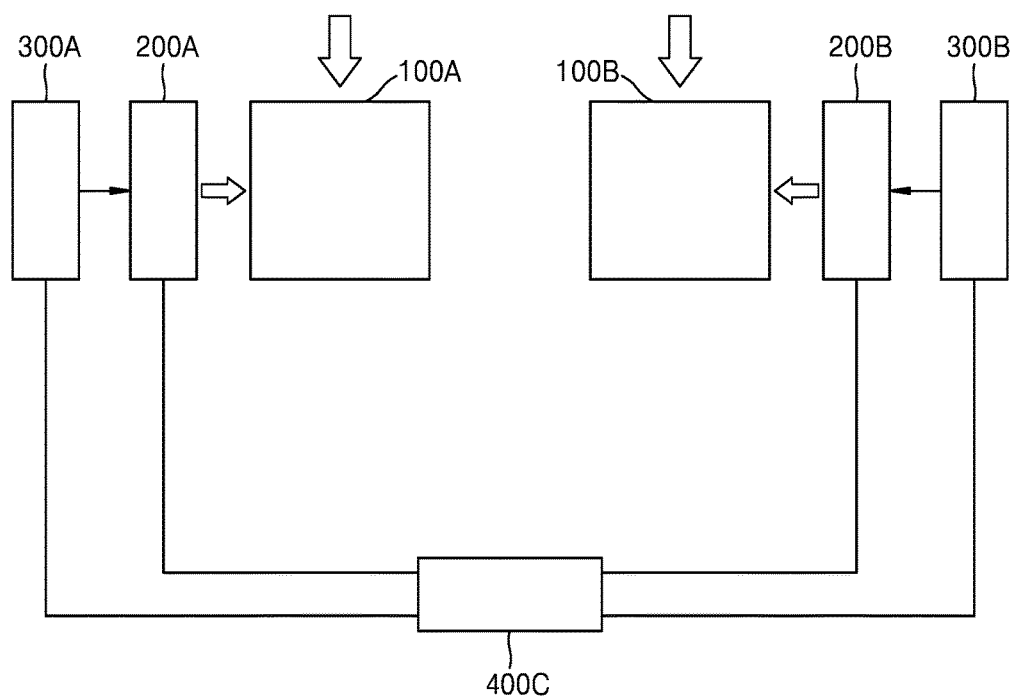
FIG. 23 is a block diagram schematically illustrating an overall structure/system of a see-through type display apparatus, according to another exemplary embodiment.

Although FIG. 22 illustrates that the first controller 400A and the second controller 400B are provided as being separate components from each other, the first controller 400A and the second controller 400B may be integrated into a single controller, and FIG. 23 illustrates an example thereof. Referring to FIG. 23, the first and second light source units 300A and 300B and the first and second image forming units 200A and 200B may be connected to a single controller 400C. Also, in some cases, the controller 400C may be connected to the light source units 300A and 300B and the image forming units 200A and 200B in a wireless manner, not in a wired manner.

Figure 24:
FIGS. 24, 25, and 26 illustrate various electronic apparatuses to which see-through type display apparatuses according to exemplary embodiments are applicable.
Figure 25:
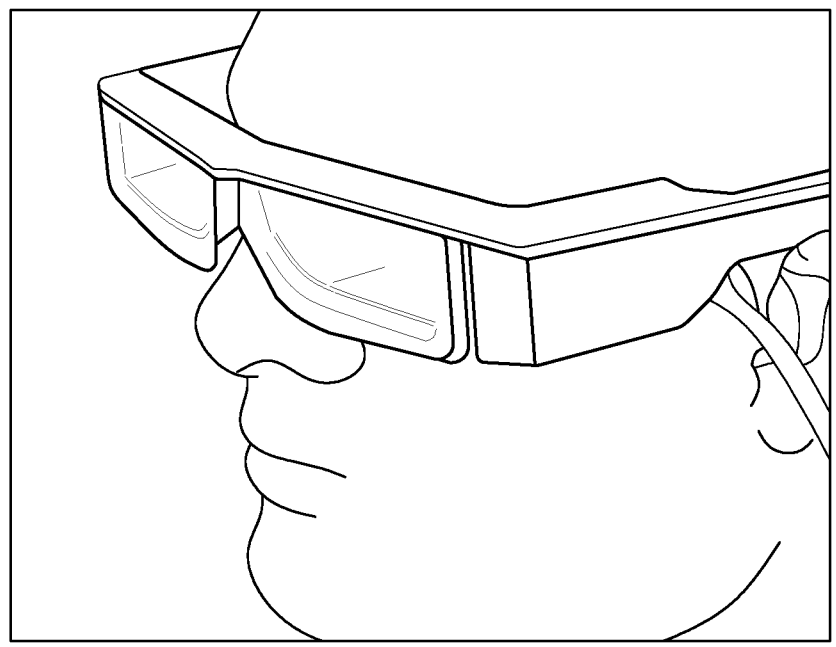
Figure 26:
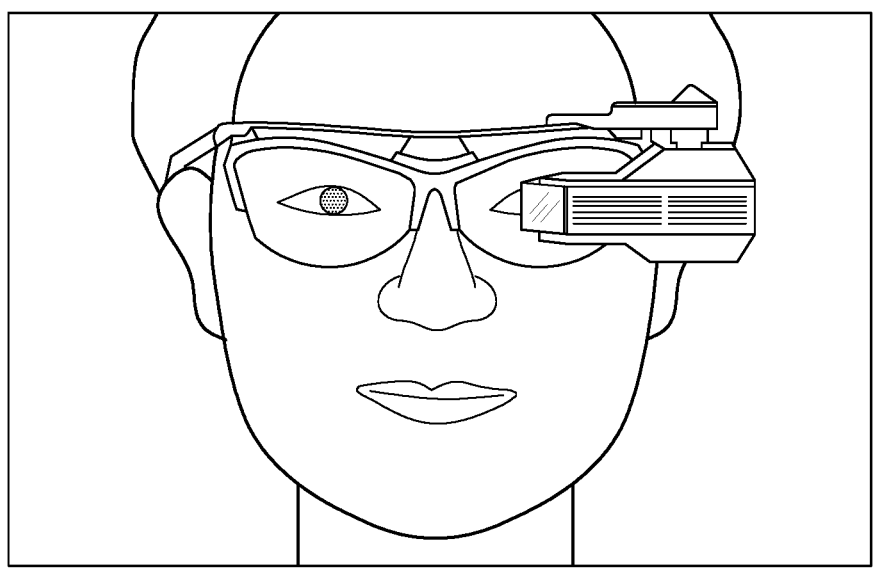

At least part of the see-through type display apparatuses according to various exemplary embodiments may constitute a wearable device. In other words, the see-through type display apparatus may be applied to a wearable device. In an example, the see-through type display apparatus may be applied to a head mounted display (HMD). Also, the see-through type display apparatus may be applied to a glasses-type display or a goggle-type display. FIGS. 24, 25, and 26 illustrate various electronic apparatuses to which the see-through type display apparatuses according to the above exemplary embodiments are applicable. The electronic apparatuses of FIGS. 24, 25, and 26 are examples of the HMD, the glasses-type display, etc. The wearable electronic apparatuses illustrated in FIGS. 24, 25, and 26 may be operated in linkage with or by being connected to smart phones.

In addition, the see-through type display apparatuses according to various exemplary embodiments may be provided in smart phones, and the smart phone may be used as the see-through type display apparatus. In other words, the see-through type display apparatus may be applied to compact electronic apparatuses or mobile electronic apparatuses, not to the wearable devices of FIGS. 24, 25, and 26. The application fields of the see-through type display apparatuses according to the above exemplary embodiments may vary in various ways. Also, the see-through type display apparatuses according to the above apparatuses may be not only used to implement augmented reality or mixed reality, but also applied to other fields. In other words, the technical concept of the exemplary embodiments may be applied not only to the augmented reality or the mixed reality but to multi-image displays capable of simultaneously viewing a plurality of images.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, it will be apparent to one of ordinary skill in the art that the structure/system of the see-through type display apparatus described with reference to FIGS. 1 to 26 may be modified in various ways, and that the application fields of the see-through type display apparatus may vary in various ways.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus comprising:
   a multipath optical member configured to transfer a first image by using light that propagates along a first path and to transfer a second image by using light that propagates along a second path to an ocular organ of a user; and
   an anisotropic optical member that is arranged between the multipath optical member and the ocular organ of the user and that includes at least one characteristic that varies based on a polarization direction of incident light,
   wherein the anisotropic optical member is configured to function as a lens with respect to the light that propagates along the first path and to function as a transparent member to transmit the light that propagates along the second path,
   wherein the anisotropic optical member comprises an internal element that has a lens shape and an external element surrounding both sides of the internal element,
   wherein one from among the internal element and the external element has anisotropic characteristics according to a polarization direction,
   wherein one of the both sides of the internal element face the multipath optical member, and
   wherein the both sides of the internal element face opposite directions from each other.

2. The display apparatus of claim 1, wherein the anisotropic optical member functioning as the transparent member is further configured to function as a flat plate with respect to the light that propagates along the second path.

3. The display apparatus of claim 1, wherein the light that propagates along the first path is polarized in a first direction and incident on the anisotropic optical member, and the light that propagates along the second path is polarized in a second direction that is orthogonal to the first direction and incident on the anisotropic optical member.

4. The display apparatus of claim 1, wherein the multipath optical member comprises one from among a beam splitter and a transflective film,
   wherein the display apparatus further comprises a first polarizer for the light that propagates along the first path provided at a side of a first incident surface of the multipath optical member, and a second polarizer for the light that propagates along the second path provided at a side of a second incident surface of the multipath optical member, and
   wherein the light that propagates along the first path is polarized by the first polarizer in a first direction, and the light that propagates along the second path is polarized by the second polarizer in a second direction that is orthogonal to the first direction.

5. The display apparatus of claim 1, wherein the multipath optical member comprises a polarization beam splitter (PBS).

6. The display apparatus of claim 5, further comprising at least one from among a first polarizer for the light that propagates along the first path provided at a side of a first incident surface of the multipath optical member and a second polarizer for the light that propagates along the second path provided at a side of a second incident surface of the multipath optical member.

7. The display apparatus of claim 1, wherein the first image includes an image formed and provided by the display apparatus, and the second image includes an outside image that is viewable by the user through the display apparatus.

8. The display apparatus of claim 1, further comprising a spatial light modulator configured to embody the first image.

9. The display apparatus of claim 8, further comprising at least one lens that is arranged in front of or at a rear of the spatial light modulator.

10. The display apparatus of claim 1, wherein the internal element comprises at least one from among a liquid crystal, an anisotropic polymer, and an anisotropic crystal, and the external element comprises an isotropic polymer.

11. The display apparatus of claim 1, wherein the internal element comprises an isotropic crystal or an isotropic polymer, and the external element comprises an anisotropic polymer.

12. The display apparatus of claim 1, wherein the internal element is of a convex lens type or a concave lens type.

13. The display apparatus of claim 1, wherein the anisotropic optical member comprises a plurality of the internal elements.

14. The display apparatus of claim 1, wherein
   the anisotropic optical member comprises at least one from among a bulk lens, a Fresnel lens, a thin lens, and a metasurface lens.

15. The display apparatus of claim 1, wherein the display apparatus has an angle of view which is greater than or equal to about 40°.

16. The display apparatus of claim 1, wherein the display apparatus is configured to implement at least one from among an augmented reality (AR) and a mixed reality (MR).

17. The display apparatus of claim 1, wherein at least a part of the display apparatus includes a wearable device.

18. The display apparatus of claim 1, wherein the display apparatus includes a head mounted display (HMD).

19. The display apparatus of claim 1, wherein the display apparatus includes at least one from among a glasses-type display and a goggle-type display.

20. A display apparatus comprising:
    a transflective member which includes light transmissive and light reflective characteristics and which is configured to transfer an outside image by using transmitted light and to transfer a separate image by using reflected light to an ocular organ of a user; and
    an anisotropic lens structure arranged between the transflective member and the ocular organ of the user, wherein the anisotropic lens structure is configured to function as a lens with respect to the reflected light and as a transparent flat plate, to transmit the transmitted light, wherein the anisotropic lens structure comprises an internal element that has a lens shape and an external element surrounding both sides of the internal element, wherein one from among the internal element and the external element has anisotropic characteristics according to a polarization direction, wherein one of the both sides of the internal element face the transflective member, and wherein the both sides of the internal element face opposite directions from each other.

21. The display apparatus of claim 20, wherein the transflective member comprises at least one from among a beam splitter and a transflective film, a first polarizer is provided at a side of a first incident surface of the transflective member, a second polarizer is provided at a side of a second incident surface of the transflective member, and light polarized by the first polarizer in a first direction is reflected by the transflective member and light polarized by the second polarizer in a second direction orthogonal to the first direction propagates through the transflective member.

22. The display apparatus of claim 20, wherein the transflective member comprises a polarization beam splitter (PBS).

23. The display apparatus of claim 20, having an angle of view greater than or equal to about 40°.

24. The display apparatus of claim 1, wherein the external element has flat surfaces at both sides of the internal element.

* * * * *